United States Patent
Kinoshita

[11] Patent Number: 6,056,456
[45] Date of Patent: *May 2, 2000

[54] KEYBOARD DEVICE

[76] Inventor: Ryohei Kinoshita, 2265-12, Sakahama, Inagi-shi, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,969

[22] Filed: Dec. 12, 1997

[51] Int. Cl.$^7$ ........................................... B41J 5/08
[52] U.S. Cl. ........................................... 400/472; 400/490
[58] Field of Search .................................. 400/472, 488, 400/491.2, 491, 492, 495, 490

[56] References Cited

U.S. PATENT DOCUMENTS

| | | | |
|---|---|---|---|
| 4,480,937 | 11/1984 | Eckhardt | 400/491.2 |
| 4,950,874 | 8/1990 | Damitio et al. | 400/472 |
| 5,141,343 | 8/1992 | Roylance et al. | 400/472 |
| 5,163,765 | 11/1992 | Levy | 400/492 |
| 5,372,442 | 12/1994 | Wang | 400/491.2 |
| 5,422,447 | 6/1995 | Spence | 400/472 |
| 5,608,603 | 3/1997 | Su | 400/472 |
| 5,874,696 | 2/1999 | Hayashi et al. | 200/5 |

*Primary Examiner*—John S. Hilten
*Assistant Examiner*—Anthony H. Nguyen
*Attorney, Agent, or Firm*—Jordan and Hamburg LLP

[57] ABSTRACT

An expandable and retractable keyboard permits alteration of an overall size thereof by permitting relative sliding movement of keys mounted to a keyboard case. Switch groups each includes at least two key switches arranged along a longitudinal direction of a respective switch group. Bases of the key switches in each switch group are connected with an adjacent one, thereby maintaining the key switches in a given group in fixed spaced apart relation to one another. At least a portion of the switch groups are slidably mounted to the keyboard case to permit mounted movement thereof relative the keyboard case along a keyboard axis. The slidably mounted switch groups are disposed in positions laterally adjacent one another, thereby collectively forming at least a portion of a keyboard pattern. Slidable mounted movement of the switch groups relative one another effects a change in dimension of the keyboard pattern in a direction of the keyboard axis. A further feature permits adjustment of a key height by placement of a leaf spring below a key top, wherein sliding displacement of the key switches removes upward biasing on the key top permitting the height of the key top to be lowered in response to the slidable displacement.

9 Claims, 16 Drawing Sheets

KEYBOARD DEVICE

BACKGROUND OF THE INVENTION

The present invention relates to an adjustable volume keyboard device, and more particularly a keyboard device which allows the intervals and height of keys to be changed horizontally or vertically such that the keyboard can expanded or retracted to alter an overall size thereof.

Keyboard devices which allow the intervals and height of keys to be changed horizontally or vertically to effect a change in overall volume are known, but they are not of specified structure which can be readily implemented in practical application.

Accordingly, it is an object of the invention to provide an adjustable volume keyboard which overcomes the drawbacks of the prior art and which is readily adapted to embodiment in a practical keyboard design.

SUMMARY OF THE INVENTION

In accordance with these and other objects of the invention, there is provided a general keyboard device, constituted by a plurality of key switches, each of which is moved in the vertical direction. A return spring is provided between a key top and a contact located below, for entering characters. Switch groups, respectively consisting of several key switches, are arranged in a predetermined direction, and are integrally connected by proper bases respectively. The switch groups are supported slidably to allow extension in the predetermined direction.

The above, and other objects, features and advantages of the present invention will become apparent from the following description read in conjunction with the accompanying drawings, in which like reference numerals designate the same elements.

DETAILED DESCRIPTION OF THE INVENTION

The drawings illustrate an example of the keyboard device of the present invention. As shown in the plan view of FIG. 1, in the keyboard device, lengthwise lining groups respectively consisting of several key switches a, a, . . . arranged to conform to a standard, are integrally connected in a zigzag pattern to form several switch groups 1, each of a general configuration as shown in FIG. 2.

Figure 5:
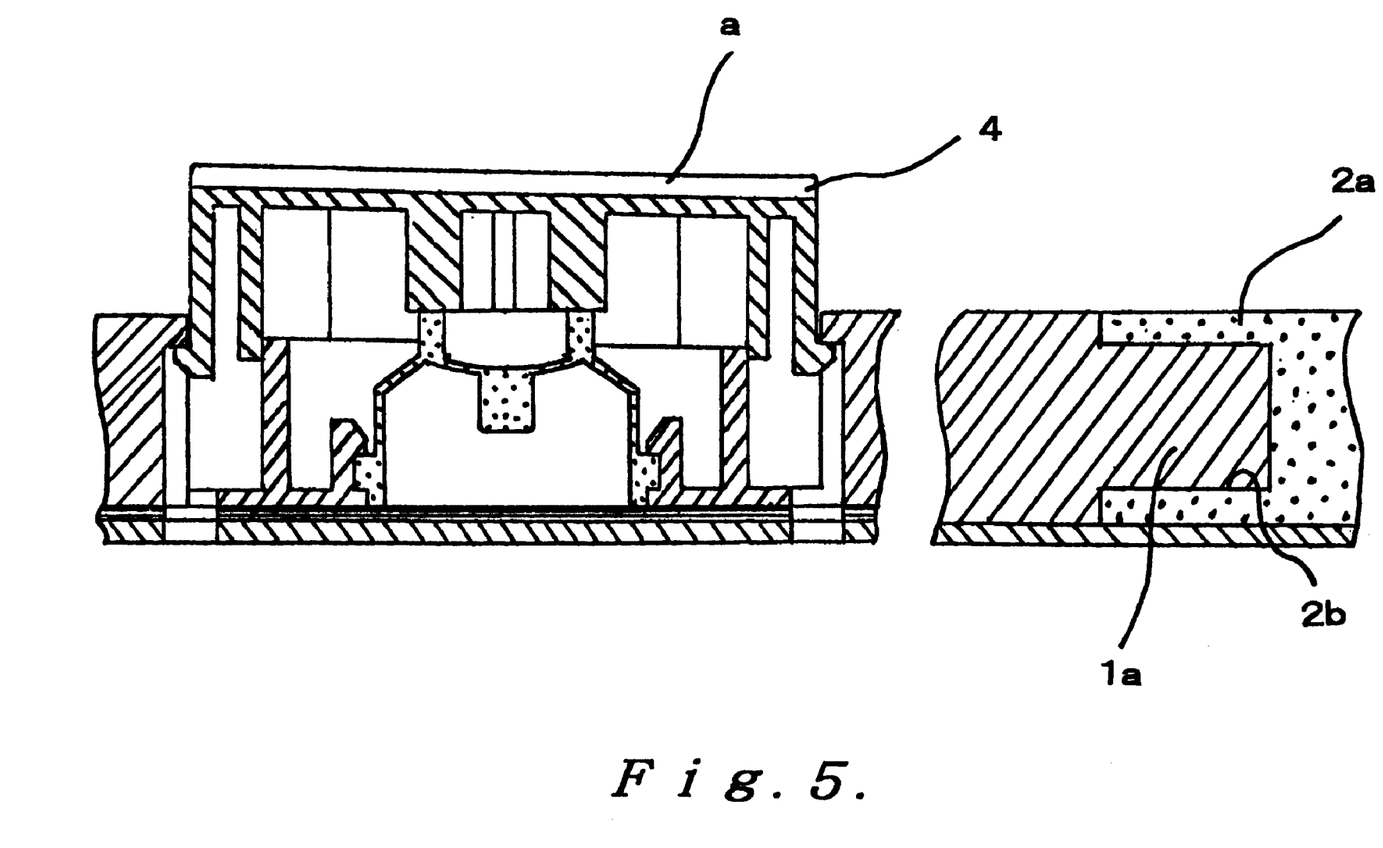
FIG. 5 is a sectional view showing a structure of a switch.
Figure 6:
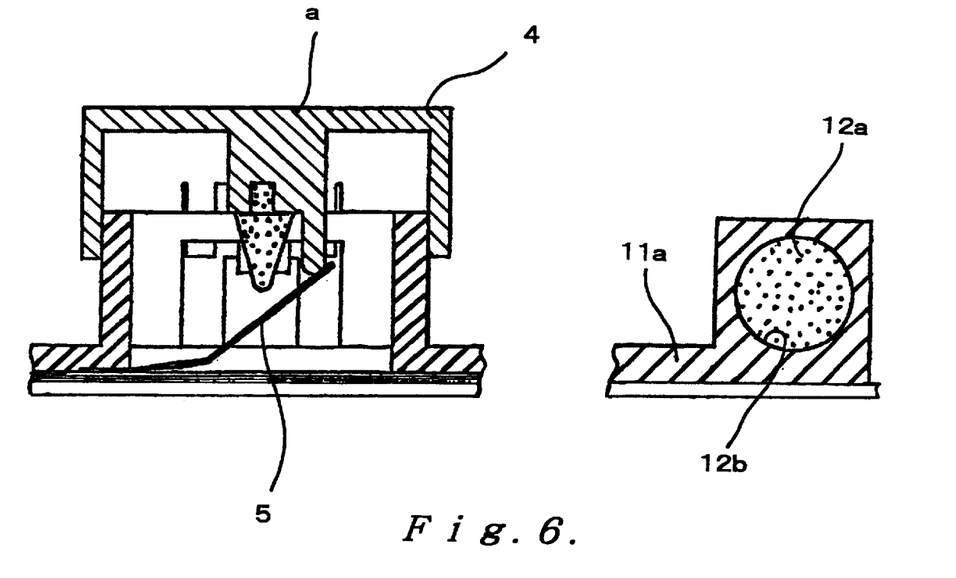
FIG. 6 is a sectional view showing another structure of a switch.

At both ends of each of these switch groups 1 in the lengthwise direction, support inserts 1a are slidably inserted into guide grooves 2b formed in the inner wall surfaces of support bodies 2a of a keyboard case as shown in FIG. 5. Alternatively, as shown in FIG. 6, extended portions 11a are provided with cylindrical guide holes 12b formed at both ends of each of the switch groups 1 in the lengthwise direction, so that support rods 12a installed in the keyboard case can be inserted through the guide holes 12b to slidably support the switch groups, for allowing extension and retraction in the horizontal direction.

Each of the switch groups 1 has guide protrusions 1b extending outwardly therefrom on one lateral side. The guide protrusions 1b are inserted into the guide receiving holes 1c formed on the other lateral side of an adjacent switch group 1. Therefore, the adjacent switch groups 1 and 1 are connected with each other to allow stable sliding operation.

Furthermore, each of the switch groups 1 includes hooks 1d formed on one lateral side, to be engaged with the inner wall of the adjacent switch group 1 near the guide receiving holes 1c. These act as a stop for limiting the movement of the respective switch groups 1 and 1.

Figure 1:
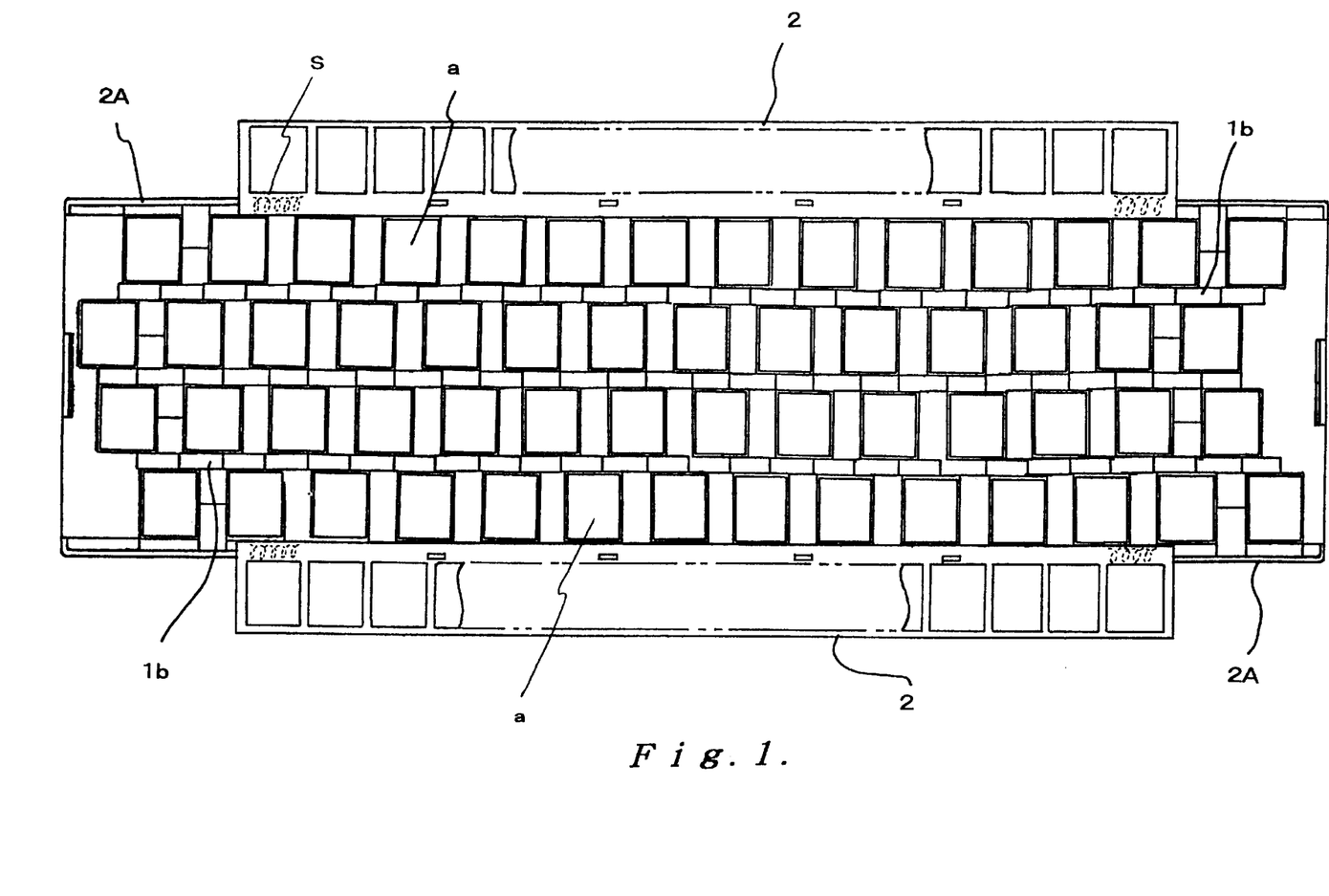
FIG. 1 is a plan view showing the keyboard device in accordance with an embodiment of the invention.
Figure 2:
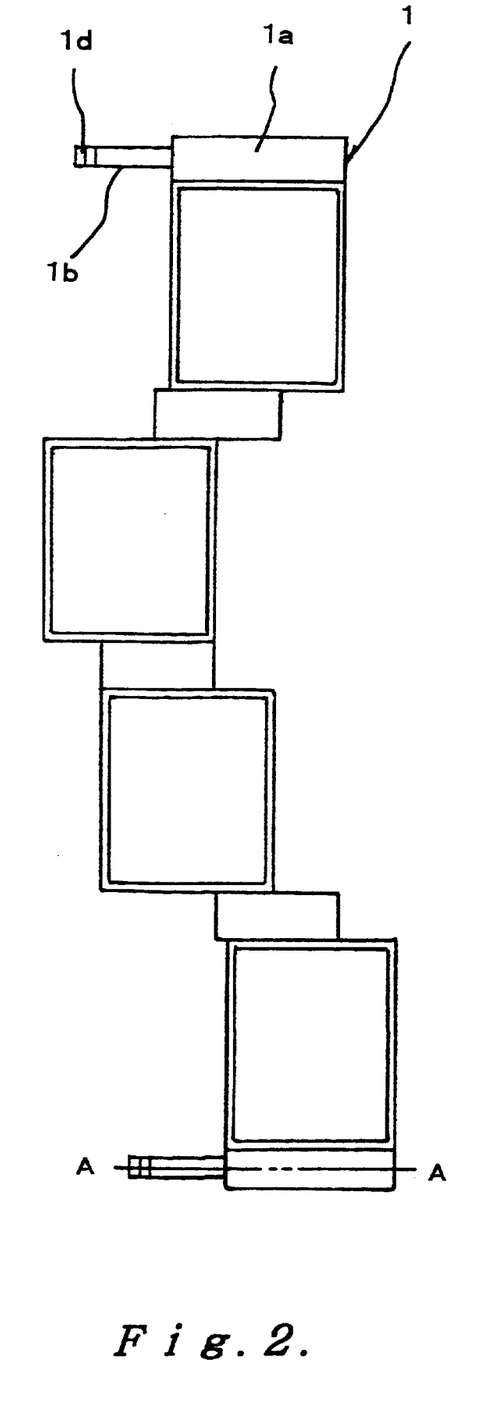
FIG. 2 is a plan view showing a switch group.
Figure 3:
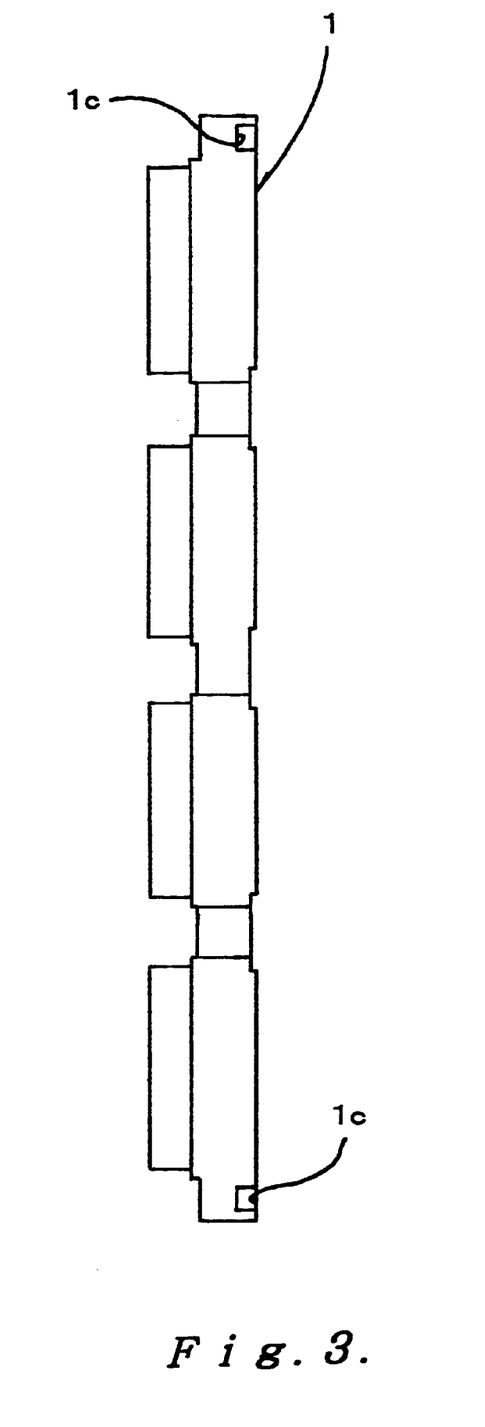
FIG. 3 is a side view showing a switch group.
Figure 4:
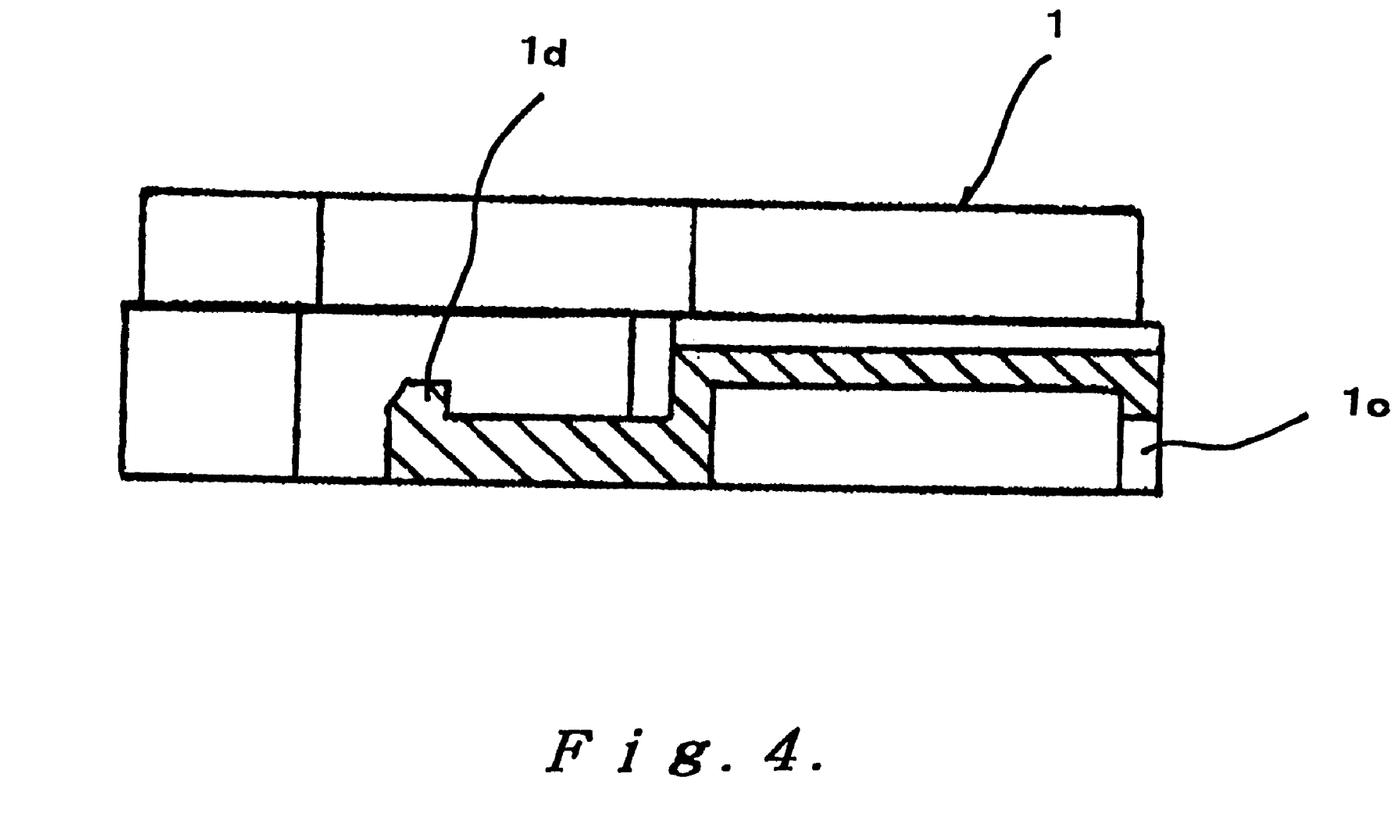
FIG. 4 is a sectional view taken on line A–A of the switch group of FIG. 2.
Figure 12:
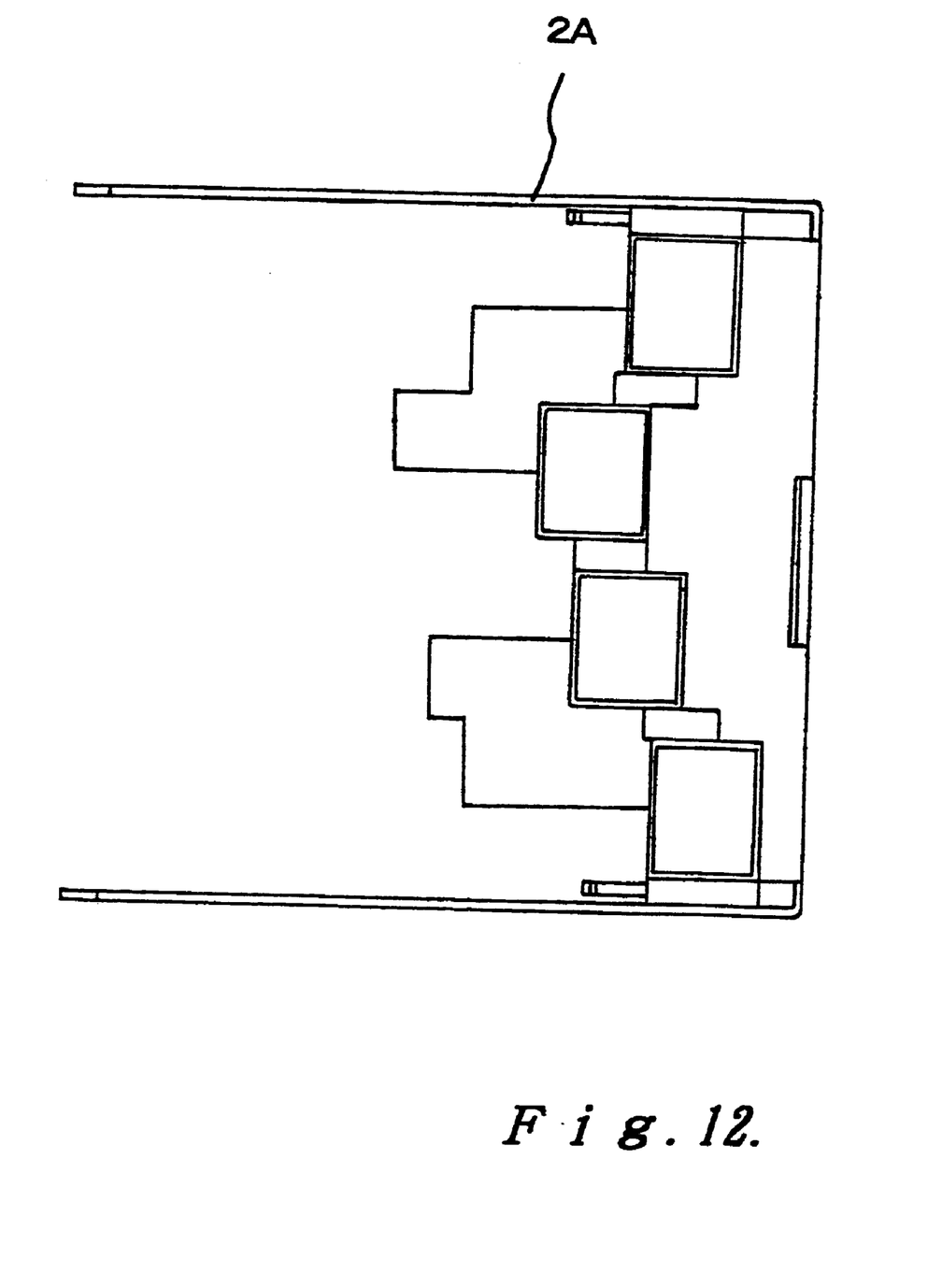
FIG. 12 is a plan view showing one support frame.
Figure 13:
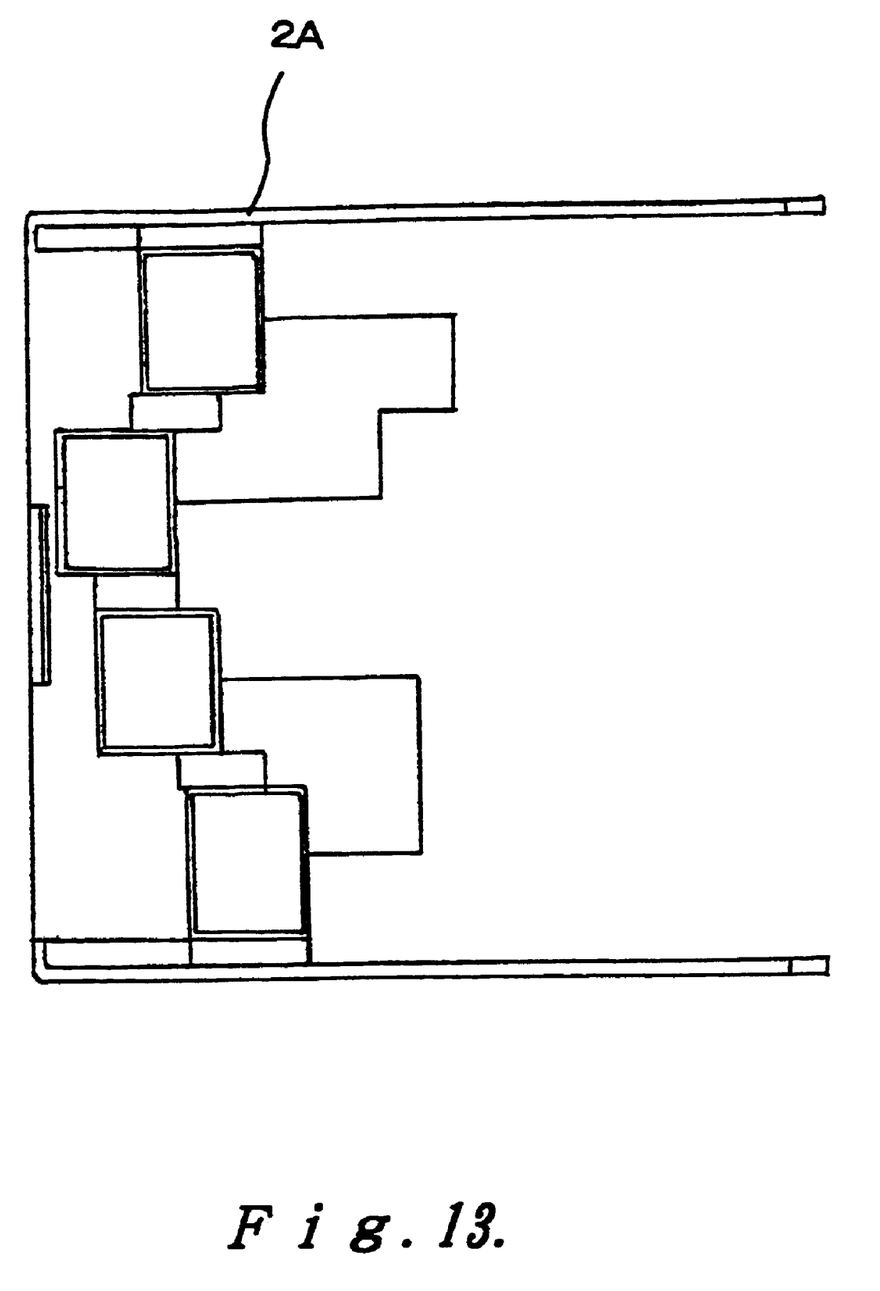
FIG. 13 is a plan view showing the other support frame.

The keyboard case 2 which supports the respective switch groups 1 is, as shown in FIG. 1, formed to have a size equal to the minimum size of the switch groups 1 after compression achieved by retractive sliding thereof. Furthermore, at both lateral ends of the keyboard case 2, as shown in FIGS. 12 and 13 in detail, support frames 2A which can slide to predetermined positions are installed. The support frames 2A support the outermost switch groups 1 when they are extended to the maximum extent without being disengaged from the keyboard case 2. If several switch groups 1 located at the center of the switch groups 1 are fixed in position, and loaded with springs S in the extension direction, the key switches can be extended at a desired time from the center to the maximum extension positions.

Figure 7:
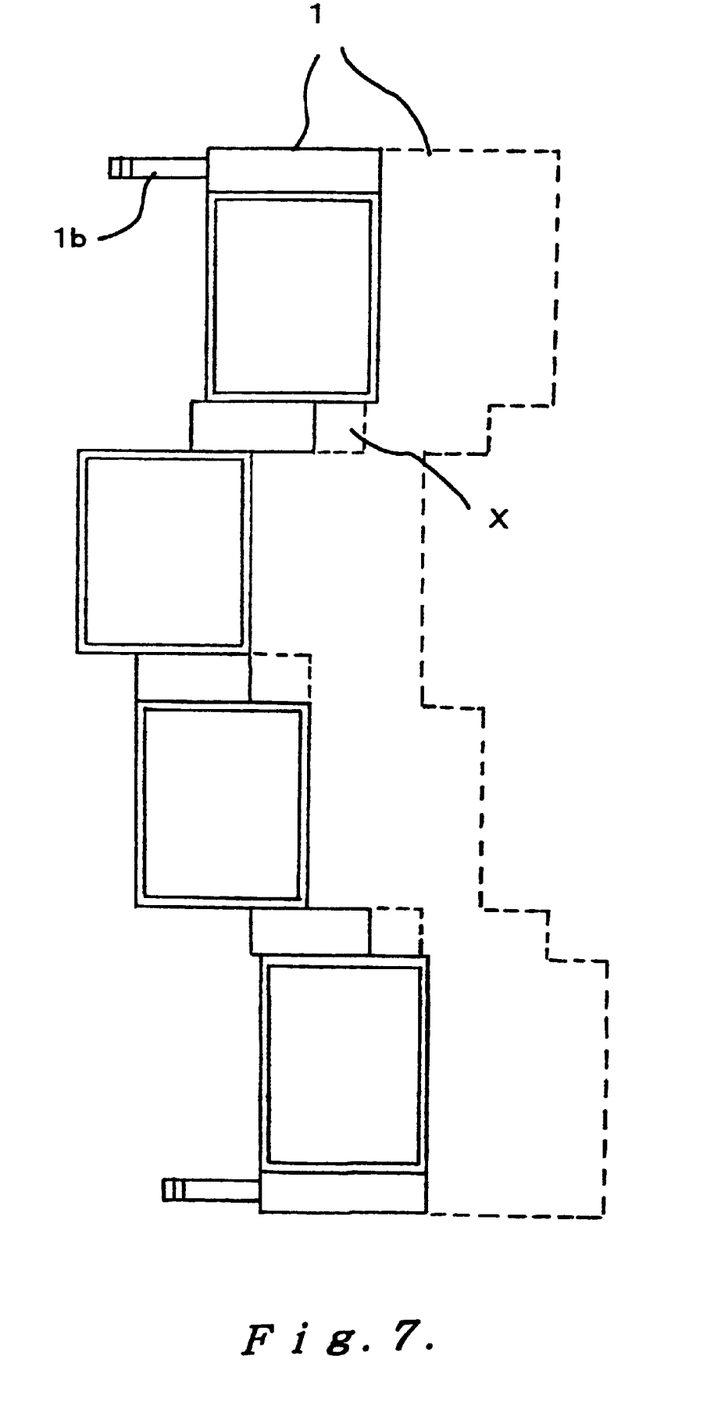
FIG. 7 is a plan view for illustrating a state in which a pair of adjacent switch groups are maintained in contact with each other.
Figure 8:
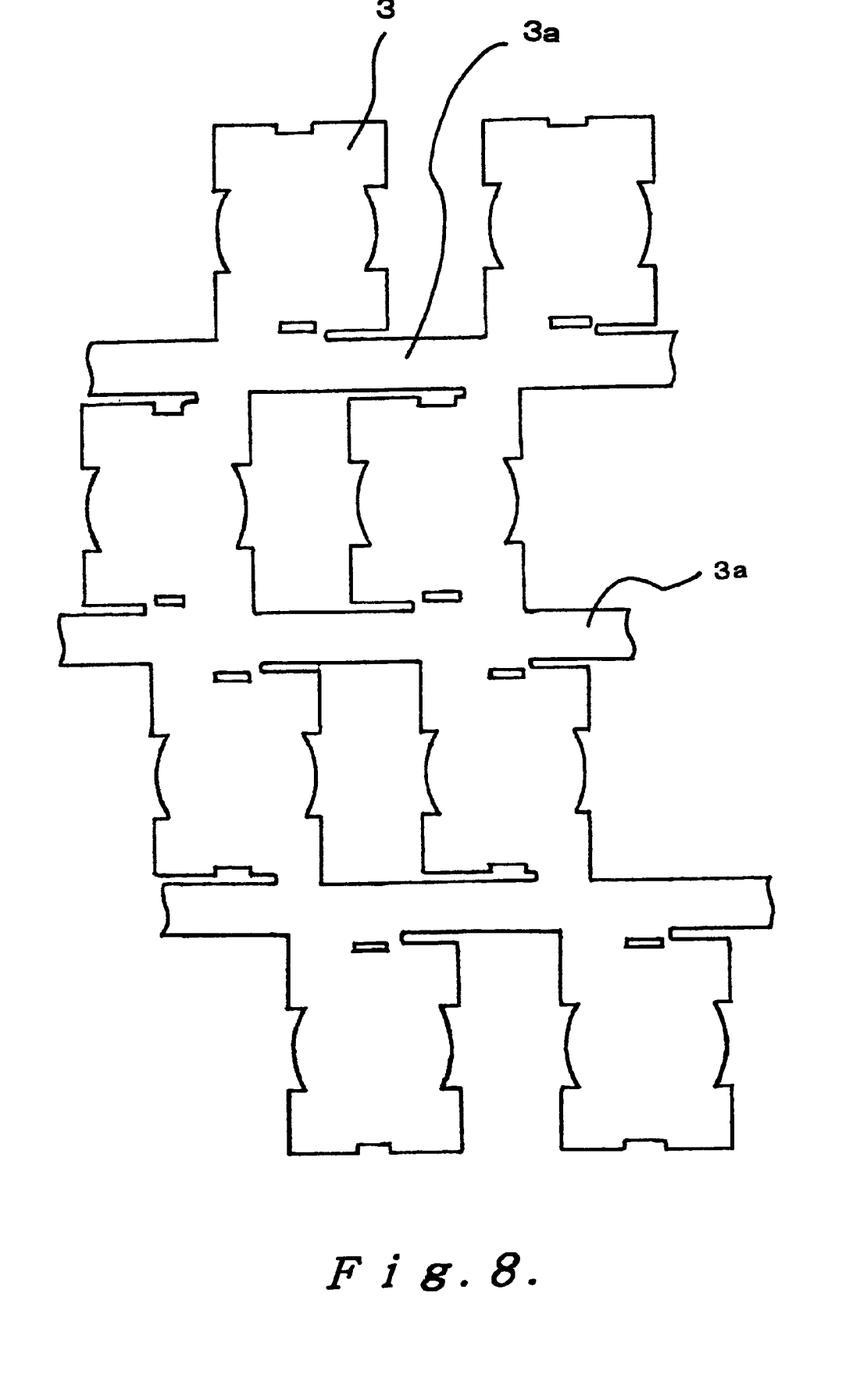
FIG. 8 is a plan view illustrating a flexible circuit.
Figure 9:
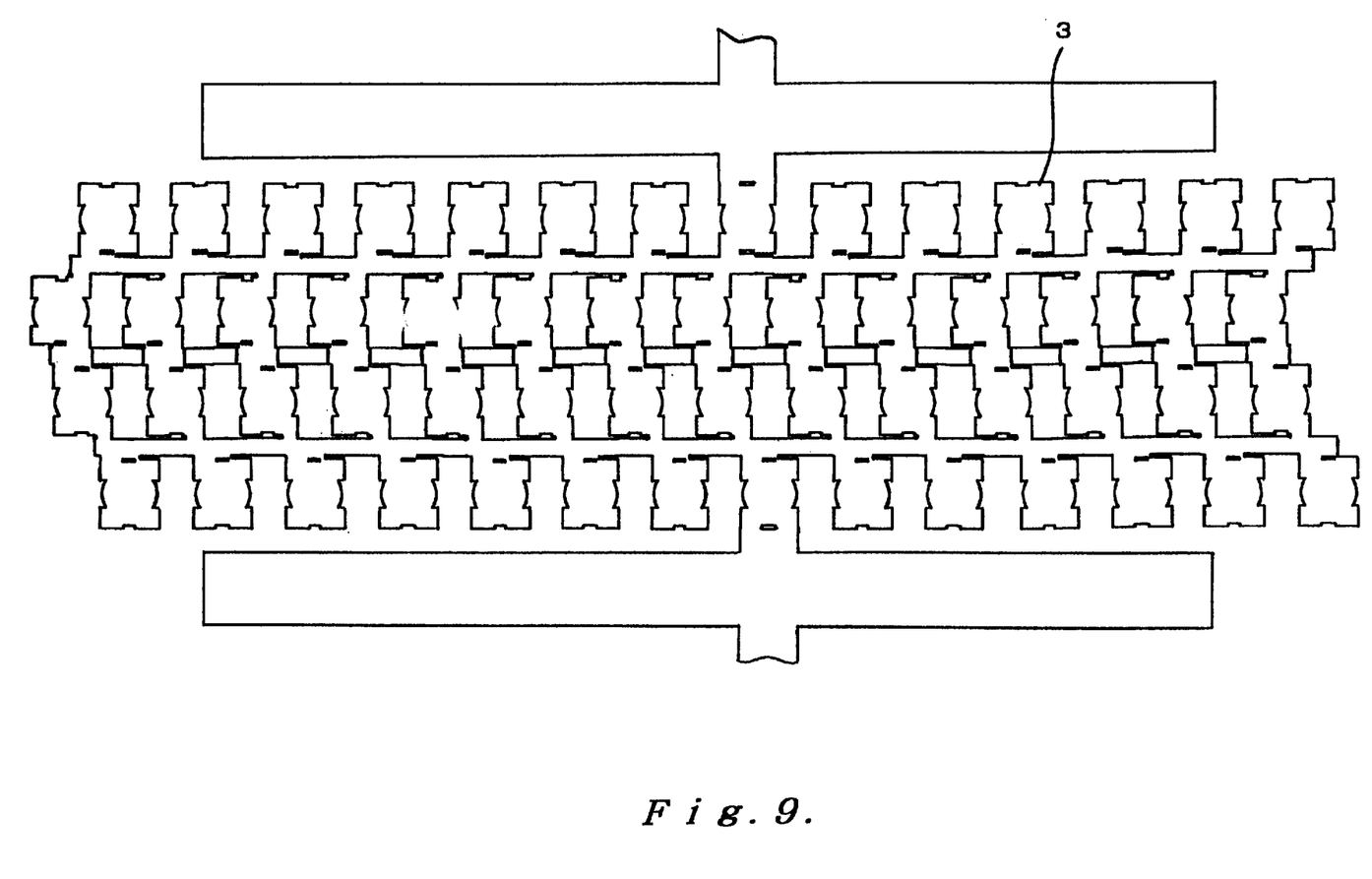
FIG. 9 is a simplified plan view showing the outline of the flexible circuit and in which depiction of the details of the circuit has been omitted.
Figure 11:
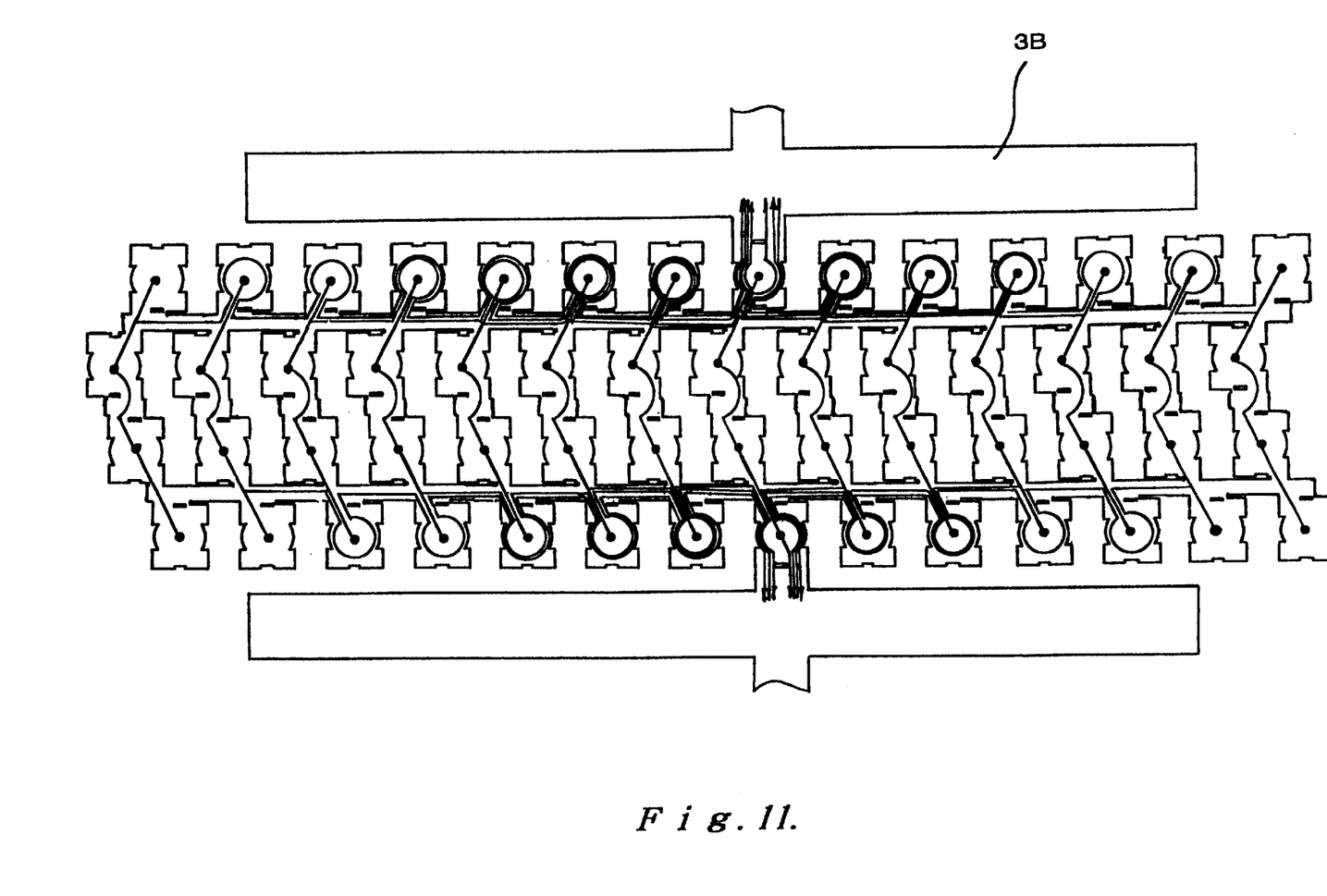
FIG. 11 is a plan view showing the bottom sheet of the flexible circuit.

Contacts are provided below the switch groups 1 formed as described above. In accordance with an embodiment of the present invention, as shown in FIGS. 8 and 11, these contacts are installed on a flexible sheet with transformable flexible portions 3a. As shown in FIG. 7, clearances X are formed between the respective switch groups 1, and the flexible portions 3a are bent and housed in the clearances X when the key switches are retracted.

Figure 10:
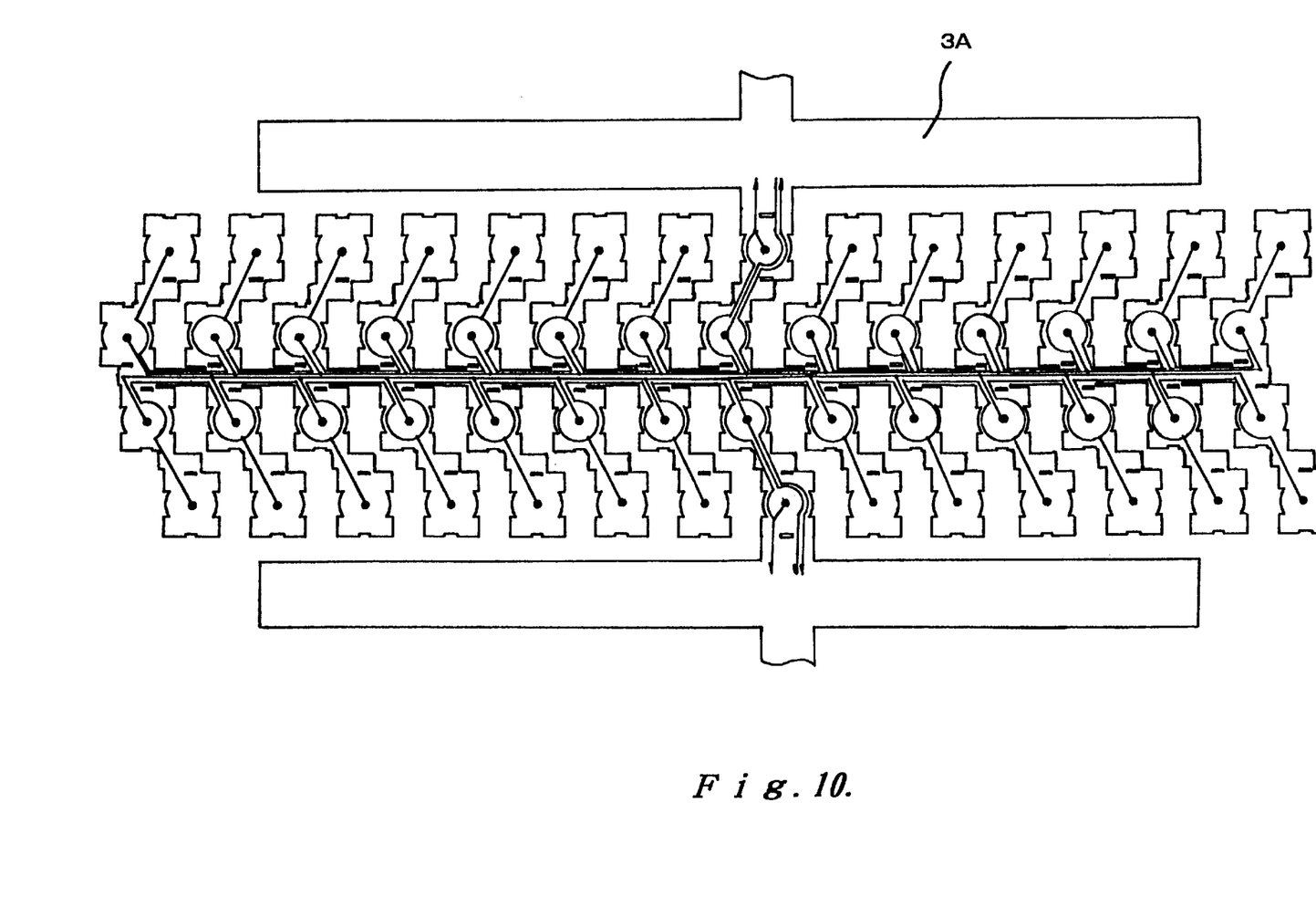
FIG. 10 is a plan view showing the top sheet of the flexible circuit.

The flexible sheet 3 is itself comprised of a top sheet 3A and a bottom sheet 3B, respectively depicted in FIGS. 10 and 11, each having portions of a printed circuit P disposed thereon, and including opposed contacts which are brought onto selective contact with one another by downward movement of a particular switch a. The top sheet 3A and the bottom sheet 3B overlap one another in the vertical direction, and the respective flexible portions 3a on which corresponding portions of the printed circuit P of each are disposed are horizontally dislocated to avoid mutual overlapping, as shown in FIGS. 10 and 11.

FIGS. 5 and 6 show two different key structures suitably used for the keyboard device of the present invention.

Figure 14:
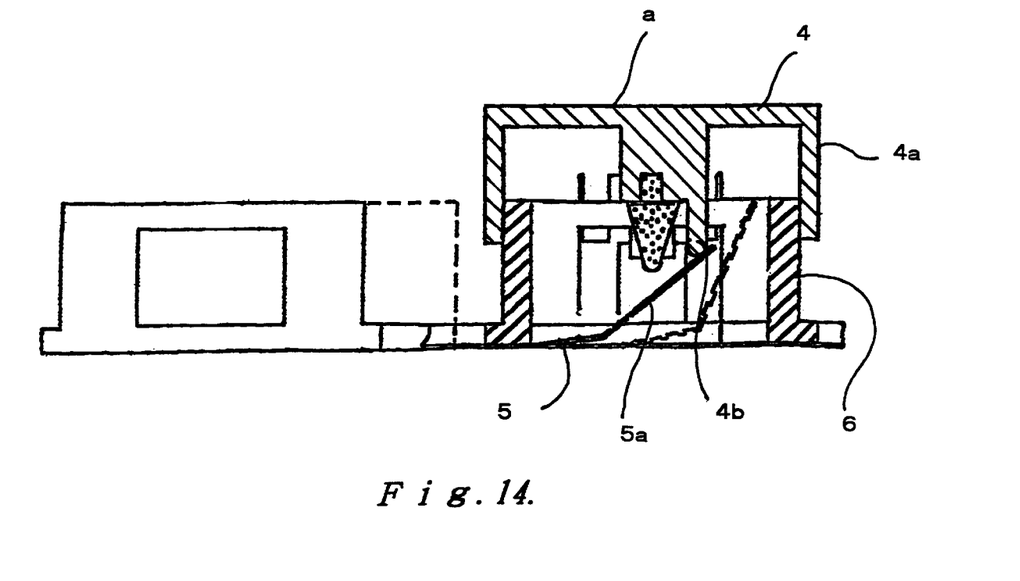
FIG. 14 is a sectional view showing a switch for illustrating the vertical movement of a key top.
Figure 15:
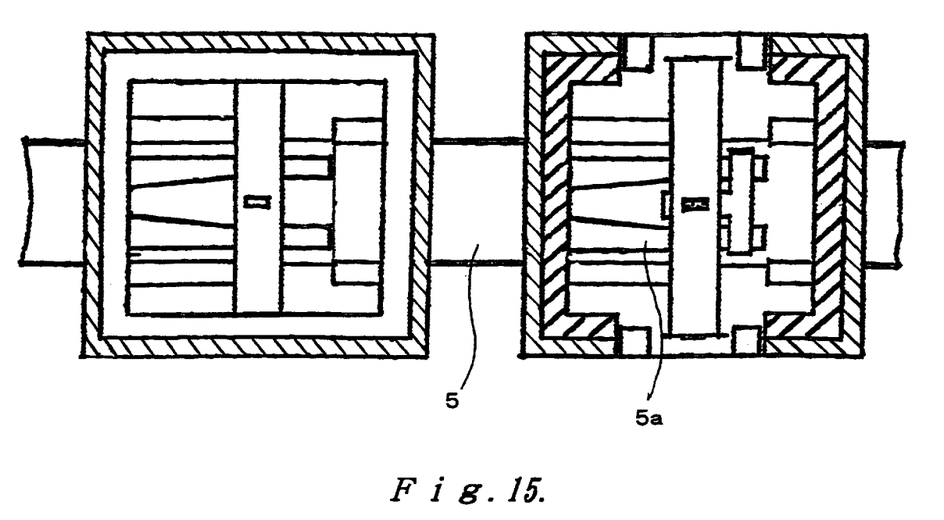
FIG. 15 is a plan view showing an essential portion for illustrating the relation between adjacent switches.

The present invention provides a keyboard device extendible and retractable in a predetermined direction by the above structure or application. In addition to the transformation within a horizontal plane, the present invention also permits the key tops 4 to be changed in height within the vertical planes as shown in FIGS. 14 and 15.

In the illustrated example, the key top 4 is conveniently provided in the form of a cap with a side wall 4a to cover the circumferential surface of a support wall 6 erected from the base, being vertically slidably supported. From about the center in the key top 4, a protrusion 4b is installed downward.

Figure 16:
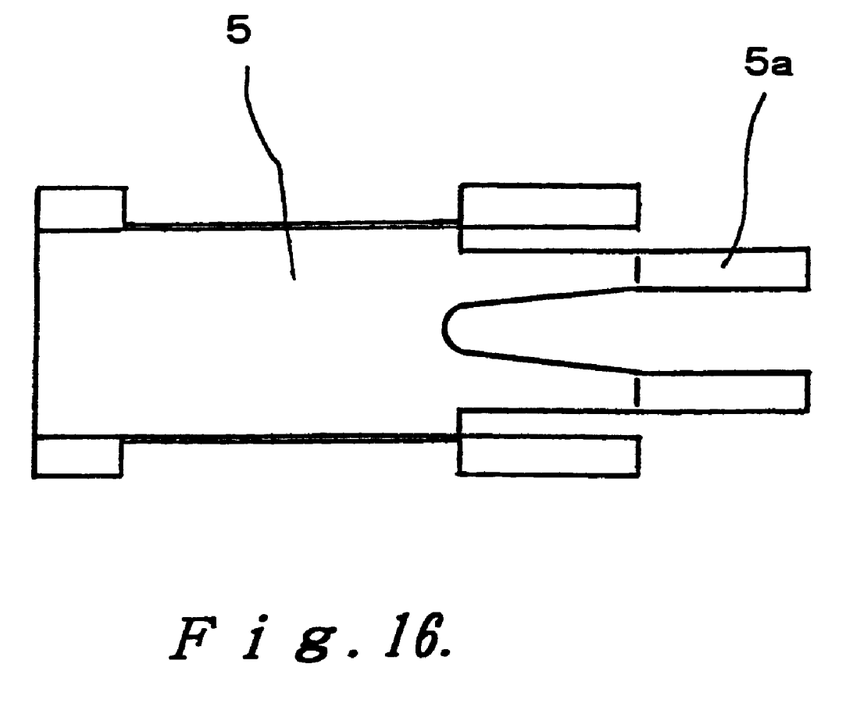
FIG. 16 is an illustration showing a leaf spring.

A return spring for maintaining upward biasing of the key top 4 is provided for each switch a in the form of a leaf spring 5. As shown in FIG. 16, leaf spring 5 includes boost tongues 5a bent upwardly from the center toward the tips. When leaf spring 5 is located at a predetermined place on the base, the tips of the boost tongues 5a are kept in contact with the bottom end of the protrusion 4b of the key top 4, to raise it to the maximum height.

Since the leaf spring 5 is fixed on the base of an adjacent switch group, the boost tongues 5a are moved away from the protrusion 4b, allowing the key top 4 to be moved downward when the switch groups are moved horizontally.

The present invention constituted as described above allows the keyboard device to be changed in volume in horizontal and vertical directions by very simple operation.

Having described preferred embodiments of the invention with reference to the accompanying drawings, it is to be understood that the invention is riot limited to those precise embodiments, and that various changes and modifications may be effected therein by one skilled in the art without departing from the scope or spirit of the invention as defined in the appended claims.

What is claimed is:

1. A keyboard device, comprising:
   a keyboard case presenting a widened expanse;
   switch groups each including at least two key switches, said at least two key switches arranged along a longitudinal direction of each of said switch groups, said at least two key switches including bases attached to one another for maintaining said at least two key switches in fixed spaced apart relation to one another within respective ones of said switch groups; and
   at least a portion of said switch groups slidably mounted to said keyboard case to permit mounted movement thereof relative said keyboard case along a keyboard axis, said switch groups being disposed in positions laterally adjacent one another and with said longitudinal axes thereof oriented crosswise said keyboard axis to collectively form at least a portion of a keyboard pattern, slidable mounted movement of said at least a portion of said switch groups relative one another thereby changing a dimension of said keyboard pattern in a direction of said keyboard axis.

2. A keyboard device according to claim 1, wherein:
   said at least a portion of said switch groups includes support inserts extending from each of said bases in positions adjacent longitudinal ends thereof; and
   structure of said keyboard case defines grooves in which said support inserts are slidably received for achieving slidable mounting of said at least a portion of said switch groups to said keyboard case.

3. A keyboard device according to claim 1, further comprising:
   guide protrusions which extend from the bases of respective ones of said at least a portion of said switch groups on a one side thereof; and
   guide protrusion receiving holes formed in the bases of the respective ones of said at least a portion of said switch groups on an opposite side thereof, said guide protrusions and said guide protrusion holes being arranged such that the guide protrusions extending from the bases of the respective ones of said at least a portion of said switch groups may be inserted into the receiving holes of adjacent ones of said switch groups.

4. A keyboard device according to claim 1, wherein at least one of the switch groups is in a fixed position.

5. A keyboard device according to claim 1, wherein each of said at least a portion of said switch groups includes a stop to limit the movement of ones of the switch groups apart from remaining ones adjacent thereto, whereby a desired spacing between adjacent ones of said at least a portion of said switch groups can be maintained when said keyboard pattern is slidably expanded.

6. A keyboard device according to claim 1, further comprising:
   support frames for supporting the switch groups and capable of sliding relative the keyboard case provided at lateral ends of the widened expanse of the keyboard case, portions of said at least a portion of said switch groups being slidable in opposed directions along said keyboard axis to achieve bidirectional expansion of said keyboard pattern; and
   a size of said widened expanse of said keyboard case along said keyboard axis being approximately equal to a minimum size of said keyboard pattern achieved by retractably sliding said at least a portion of said switch groups, said support frames extending beyond said lateral ends of the keyboard case when said portions of said at least a portion of said switch groups are slidably moved in said opposed directions to expand said keyboard pattern.

7. A keyboard device according to claim 1, further comprising:
   a flexible sheet located below said keyboard pattern;
   contacts provided on said flexible sheet;
   said flexible sheet including flexible portions disposed between said contacts; and
   said switch groups including structure defining clearances in which said flexible portions are receivable when bendably deformed by retractable slidable movement of said at least a portion of said switch groups.

8. A keyboard device according to claim 7, wherein:
   said flexible sheet has a two-layer structure comprised of a top sheet and a bottom sheet overlapping one another in a vertical direction, respective portions of a printed circuit being carried on said top and bottom sheets; and
   at the flexible portions, the respective portions of the printed circuit of the top sheet and the printed circuit as the bottom layer are dislocated to avoid mutual overlapping.

9. A keyboard device according to claim 1, further comprising:
   at least one leaf spring;
   at least one of said at least two key switches including a key top movable in a vertical direction from a raised position to a lowered position; and a free end of said leaf spring extending below said at least one of said at least two key switches, another end of said at least one leaf spring being attached to said base of another of said at least two key switches of a different one of said at least a portion of said key groups located laterally adjacent thereto, said another end contacting a portion of said key top and upwardly biasing same into said raised position when said one of said at least two key switches is slidably separated laterally from said another of said at least two key switches, said another end being brought out of biasing contact with said portion of said key top when same when said one of said at least two key switches is slidably moved laterally towards said another of said at least two key switches, permitting unrestricted movement of said key top to said lowered position.

* * * * *